United States Patent [19]

Kondo

[11] Patent Number: 5,162,998
[45] Date of Patent: Nov. 10, 1992

[54] CONSTANT-SPEED REGULATING DEVICE FOR A VEHICLE

[75] Inventor: Yasuhiro Kondo, Hirakata, Japan

[73] Assignee: Matsushita Electric Industrial Co., Ltd., Osaka, Japan

[21] Appl. No.: 770,746

[22] Filed: Oct. 3, 1991

Related U.S. Application Data

[63] Continuation of Ser. No. 448,792, Dec. 11, 1989, abandoned.

[30] Foreign Application Priority Data

Dec. 12, 1988 [JP] Japan .................. 63-313441

[51] Int. Cl.$^5$ .................................... B60K 31/00
[52] U.S. Cl. .................. 364/426.04; 180/179; 123/352
[58] Field of Search ........ 364/426.04, 426.01; 180/179; 123/352

[56] References Cited

U.S. PATENT DOCUMENTS

| | | | |
|---|---|---|---|
| 4,046,213 | 9/1977 | Larson | 364/426.04 |
| 4,709,335 | 11/1987 | Okamoto | 364/431.05 |
| 4,725,969 | 2/1988 | Onogi et al. | 364/565 |
| 4,737,913 | 4/1988 | Blee et al. | 364/426.04 |
| 4,843,553 | 6/1989 | Ohata | 364/426.04 |
| 4,926,334 | 5/1990 | Suzuki et al. | 364/426.04 |

Primary Examiner—Thomas G. Black
Attorney, Agent, or Firm—Panitch Schwarze Jacobs & Nadel

[57] ABSTRACT

A constant-speed regulating device for a vehicle comprising: a control circuit which receives information regarding the running velocity of the vehicle and produces an output signal as a result of calculations in which said information and control constants are used; a drive circuit which receives the output signal and produces an drive signal; and an actuator for opening and closing the throttle valve of the vehicle. The actuator is driven in accordance with the drive signal. The actuator comprises a stepping motor. The control circuit receives data regarding the type of the vehicle, the state of the engine, and the gear position, and comprises: a first memory means for storing the rotation angle of the stepping motor which is within or beyond one revolution; a means for modifying at least one of the control constants; and a second memory means for storing said control constants even when the main power is turned off. The modifying means modifies at least one of the control units in accordance with one or more items of the data.

10 Claims, 6 Drawing Sheets

CONSTANT-SPEED REGULATING DEVICE FOR A VEHICLE

This application is a continuation of Ser. No. 07/448,792 filed Dec. 11, 1989 now abandoned.

BACKGROUND OF THE INVENTION

1. Field of the Invention:

This invention relates to a constant-speed regulating device for a vehicle which causes the vehicle to automatically run at a constant speed when driving on expressways, etc.

2. Description of the Prior Art:

In recent years, electric motor-equipped constant-speed regulating devices comprising an electric motor-driven actuator have been commonly used as constant-speed regulating devices for vehicles, due to the trend toward higher r.p.m. engines and their ease of handling in assembly.

With reference to FIGS. 4 to 6, a conventional motor-equipped constant-speed regulating device will be described. FIG. 4 is a block diagram of a conventional motor-equipped constant-speed regulating device. The constant-speed regulating device shown in FIG. 4 comprises a control circuit 1, a drive circuit 2, an actuator 3, a throttle cable 4, a throttle valve 5, and a throttle position sensor 6. The control circuit 1 receives a vehicle velocity signal input 1a, operation switch inputs 1b which designate settings, acceleration, deceleration, etc., a cancel input 1c which indicates the cancel of the constant-speed running when the brake pedal or the like is operated. The actuator 3 comprises a DC motor 3a, a reduction gear and clutch assembly 3b, and a pulley 3c. The cable 4 interconnects the pulley 3c and the throttle valve 5. The resistance of the sensor 6 varies in accordance with the degree of the opening (throttling) of the throttle valve 5.

The operation of the constant-speed regulating device of FIG. 4 in which the control circuit 1 is set to the operating condition will be described. First, the vehicle velocity signal 1a is input to the control circuit 1, and measured in the vehicle velocity measuring block 7 shown in FIG. 5, to be set as the vehicle velocity V. Then, the difference $\Delta V$ between the vehicle velocity V and the target vehicle velocity is calculated in block 8. Block 9 judges whether this $\Delta V$ is zero or whether the absolute value $|\Delta V|$ of the velocity difference $\Delta V$ is smaller than a previously fixed value A. If true, no operation command is sent to the drive circuit 2, and the sequence returns to block 7. If false, block 10 then judges whether $\Delta V$ is larger than another previously fixed value B which is greater than the above-mentioned value A. If false, block 11 then calculates the integral of $\Delta V$. If true and after block 11, block 12 calculates the differential of the vehicle velocity V.

Next, in block 13, the multiplications of the velocity difference $\Delta V$ and a first coefficient $K_1$, the integral of the velocity difference $\Delta V$ and a second coefficient $K_2$, and the differential of the velocity difference $\Delta V$ and a third coefficient $K_3$ are added together, and the result is designated as E as follows:

$$E = K_1 \cdot \Delta V + K_2 \cdot \int_{t_1}^{t_2} \Delta V dt + K_3 \cdot (dV/dt) \qquad (Eq. 1)$$

In block 14, a motor voltage (or motor current) corresponding to the value E is determined and is output to the drive circuit 2. This causes the motor 3a to rotate clockwise or counter clockwise according to the value of E. After being reduced by the gear and clutch assembly 3b, the rotation of the motor 3a causes the pulley 3c to rotate, thereby actuating the throttle valve 5 through the cable 4 so that the throttling is adjusted.

The engine characteristics, as shown in FIG. 6 in which the horizontal axis is the vehicle velocity and the vertical axis the thrust, can be indicated by curves 15a to 15e using the degree of throttling as a parameter. If all external conditions of the vehicle are the same, the running resistance of the vehicle, as indicated by the broken line 16, can be expected to be a function of the vehicle velocity. The engine output and running resistance of a vehicle running at velocity $V_1$ and degree of throttling 15c exist at point 17. Assuming that the running resistance changes from point 17 to point 18 due to changes in road conditions, etc., and the degree of throttling remains in the curve 15c, the operating point will change to point 19 and the velocity will change from $V_1$ toward $V_2$. Therefore, in order to maintain the same vehicle velocity $V_1$, the degree of throttling must be changed from 15c to 15d. This operation of the throttle valve 5 is achieved by the rotation of the pulley 3c.

In the above configuration, however, the amount of rotation of the pulley 3c i.e., the throttling of the throttle valve 5 must be based on the engine characteristics and running resistance characteristics (i.e., gear positions, vehicle characteristics), etc. Therefore, it is necessary to finely adjust the above-mentioned constants $K_1$, $K_2$ and $K_3$ for each vehicle. Further, adjustment of the condition of the mechanical linkage from the gear and clutch assembly 3b through the pulley 3c and the cable 4 to the throttle valve 5 is also necessary for each vehicle.

This necessitates the control circuit 1 to be separately adjusted for each type of vehicle, so that the common application of a constant-speed regulating device to different types of vehicles is difficult or impossible.

The DC motor 3a rotates at an angular velocity $\omega$ determined by the following equation (2):

$$T_m - T_L = J_m \cdot (d\omega/dt) + D_m \cdot \omega \qquad (Eq. 2).$$

where $T_m$ is the motor torque, $J_m$ the motor shaft reduced inertia, $T_L$ the load, and $D_m$ the viscous drag. The above-mentioned determination of the motor voltage (or current) in block 14 causes only the motor torque $T_m$ to be determined, but the motor speed $\omega$ remains to be determined. The angular velocity $\omega$ is determined by equation (2). The load $T_L$, in particular, in equation (2) varies with the vehicle, and the motor speed is affected by this.

Since the degree of the throttling of the throttle valve 5 is equal to the integral of the angular velocity $\omega$, the degree of the throttling is not determined by merely determining the motor voltage (or current), resulting in that the degree of the throttling must be fedback via the throttle position sensor 6 to correctly determine the degree of throttling.

SUMMARY OF THE INVENTION

The constant-speed regulating device for a vehicle of this invention, which overcomes the above-discussed and numerous other disadvantages and deficiencies of the prior art, comprises a control circuit which receives information regarding the running velocity of the vehicle and produces an output signal as a result of calculations in which said information and control constants are used; a drive circuit which receives said output signal and produces a drive signal; and an actuator for opening and closing the throttle valve of the vehicle, said actuator being driven in accordance with said drive signal, said control circuit comprises: a means for modifying at least one of said control constants; and a means for storing said control constants even when the main power is turned off.

In a preferred embodiment, the control circuit receives data regarding at least the type of vehicle, the state of the engine, and the gear position, and said modifying means modifies at least one of said control units in accordance with one or more items of said data.

In a preferred embodiment, the control constants are those used in a PID control system.

In a preferred embodiment, the control constants consist of one of previously determined constants and a coefficient portion which is to be multiplied thereto, the value of said coefficient portion being changeable, said coefficient portion being stored even when the main power is turned off.

The constant-speed regulating device for a vehicle comprises a control circuit which receives information regarding the running velocity of the vehicle and produces an output signal; a drive circuit which receives said output signal and produces a drive signal; and an actuator for opening and closing the throttle valve of the vehicle, said actuator being driven in accordance with said drive signal, said actuator comprises a stepping motor which functions as the driving power source, and said control circuit comprises a means for storing the rotation angle of said stepping motor.

In a preferred embodiment, the storing means stores the rotation angle of said stepping motor which is within one revolution.

In a preferred embodiment, the storing means stores the rotation angle of said stepping motor which is beyond one revolution.

In a preferred embodiment, the storing means is a nonvolatile memory which can retain its contents even when the main power is turned off.

The constant-speed regulating device for a vehicle comprises a control circuit which receives information regarding the running velocity of the vehicle and produces an output signal as a result of calculations in which said information and control constants are used; a drive circuit which receives said output signal and produces a drive signal; and an actuator for opening and closing the throttle valve of the vehicle, said actuator being driven in accordance with said drive signal, said actuator comprises a stepping motor which functions as the driving power source, said control circuit receives data regarding at least the type of vehicle, the state of the engine, and the gear position, and comprises: a first memory means for storing the rotation angle of said stepping motor which is within or beyond one revolution; a means for modifying at least one of said control constants, said modifying means modifying at least one of said control units in accordance with one or more items of said data; and a second memory means for storing said control constants even when the main power is turned off.

In a preferred embodiment, the first memory means retains its contents even when the power of said control circuit is turned off.

In a preferred embodiment, the control constants are those used in a PID control system.

In a preferred embodiment, the control constants consist of one of previously determined constants and a coefficient portion which is to be multiplied thereto, the value of said coefficient portion being changeable, said coefficient portion being stored even when the main power is turned off.

Thus, the invention described herein makes possible the objectives of (1) providing a constant-speed regulating device which can be applied to a vehicle regardless of the type of vehicle; (2) providing a constant-speed regulating device which always has optimized control constants; and (3) providing a constant-speed regulating device which can accurately adjust the degree of the throttling without using a throttle position sensor.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

According to the invention, the control circuit changes the control constants based on the feedback of control results, and determines the motor voltage or current based on these control constants. Hence, optimal control for any change in vehicle type or mechanical linkage is possible. These constants are stored in a memory, and retained therein even when the power is turned off, so that constants which have been optimally determined can be used repeatedly after the power is turned on again, thus enhancing the ease with which the control circuit can be commonly applied.

The degree of the rotation of a stepping motor can be accurately controlled with a one-to-one relationship to the input. According to the invention, the degree of the rotation over one or more revolutions can be stored in a memory means, so that a one-to-one relationship between the throttle position sensor and the amount of shift stored can be used. Hence, the constant-speed regulating device according to the invention can accurately control the throttle position (degree of opening) without using a throttle position sensor.

Figure 1:
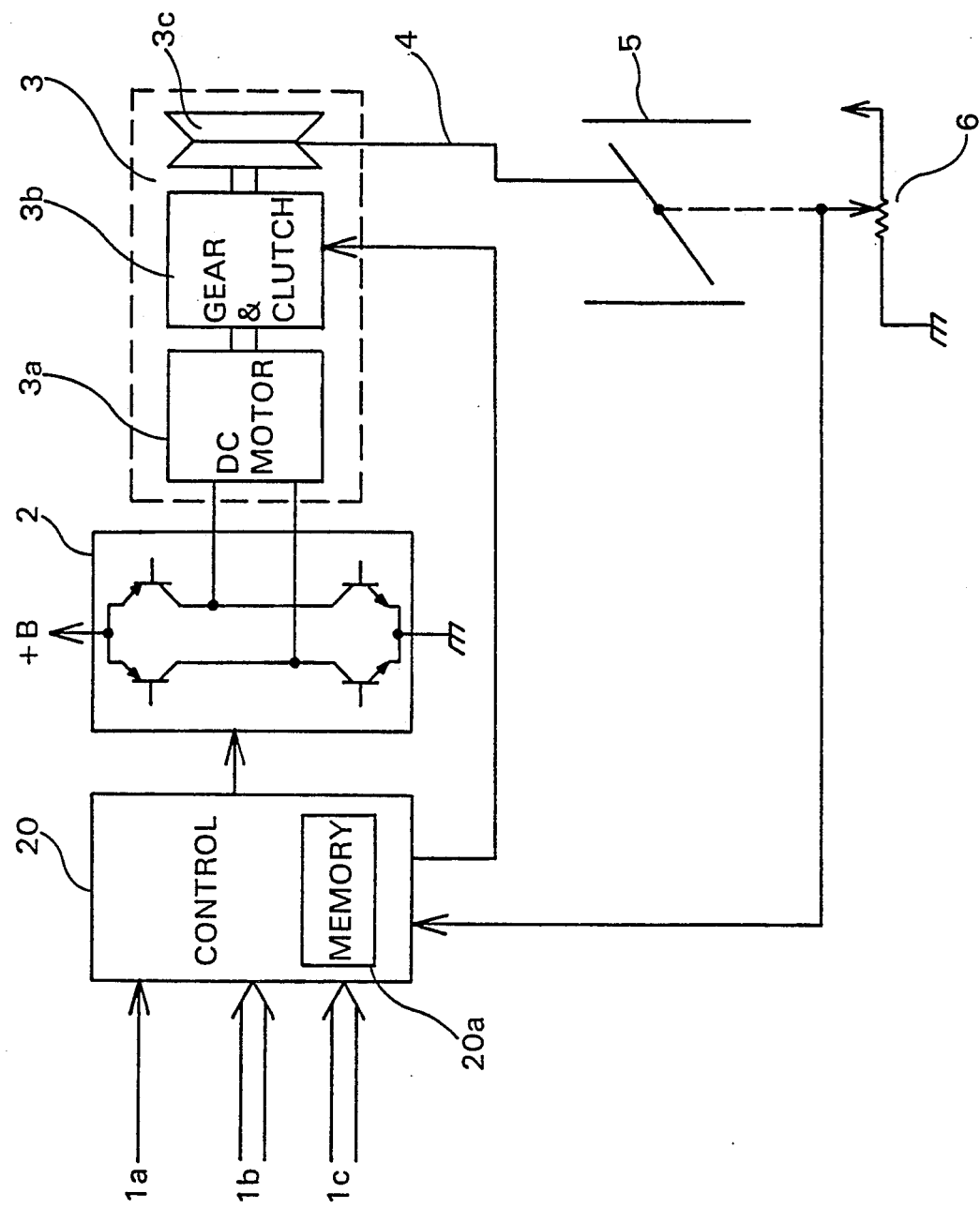
FIG. 1 is a block diagram illustrating a constant-speed regulating device according to the invention.
Figure 4:
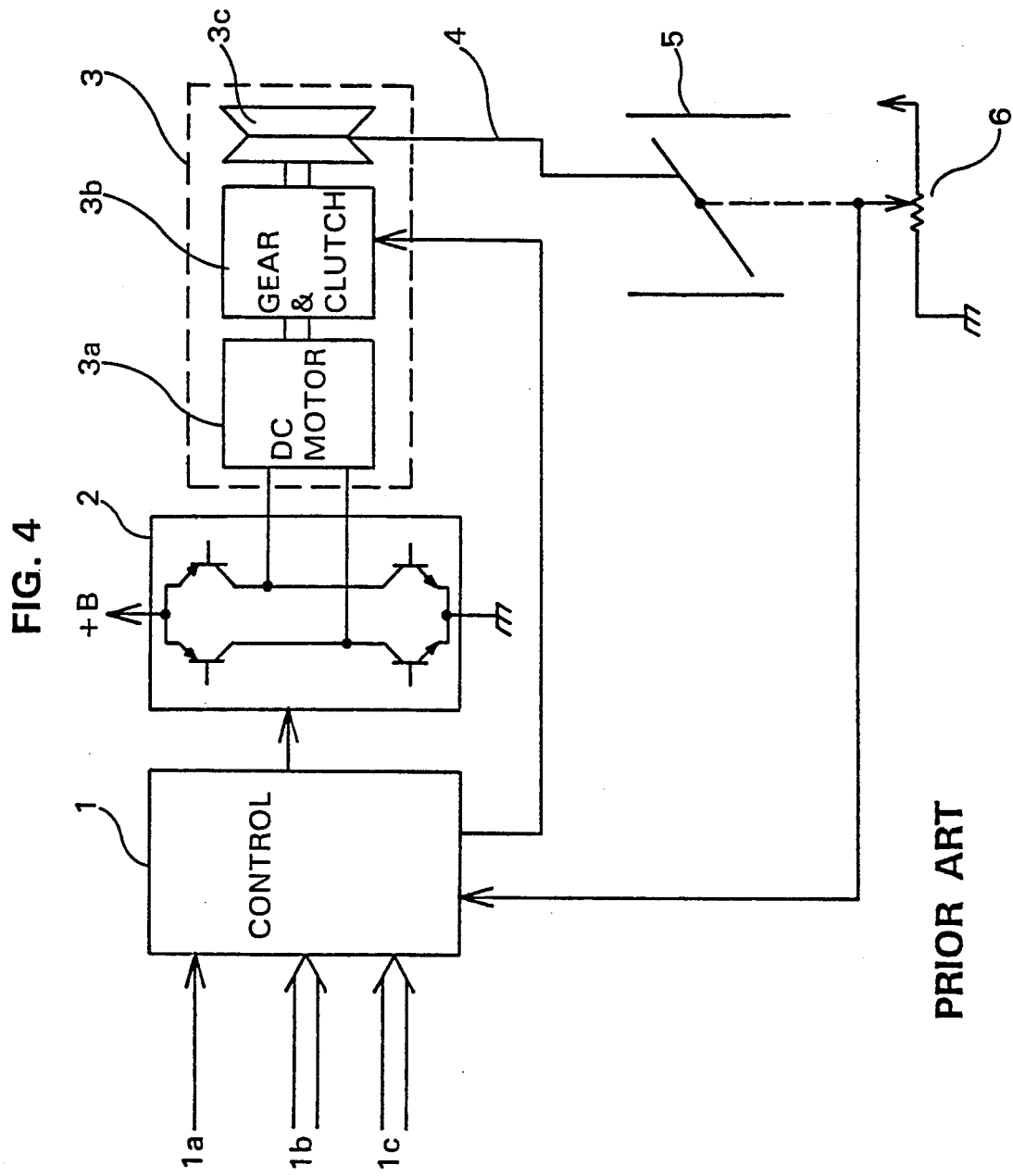
FIG. 4 is a block diagram illustrating a conventional constant-speed regulating device.
Figure 5:
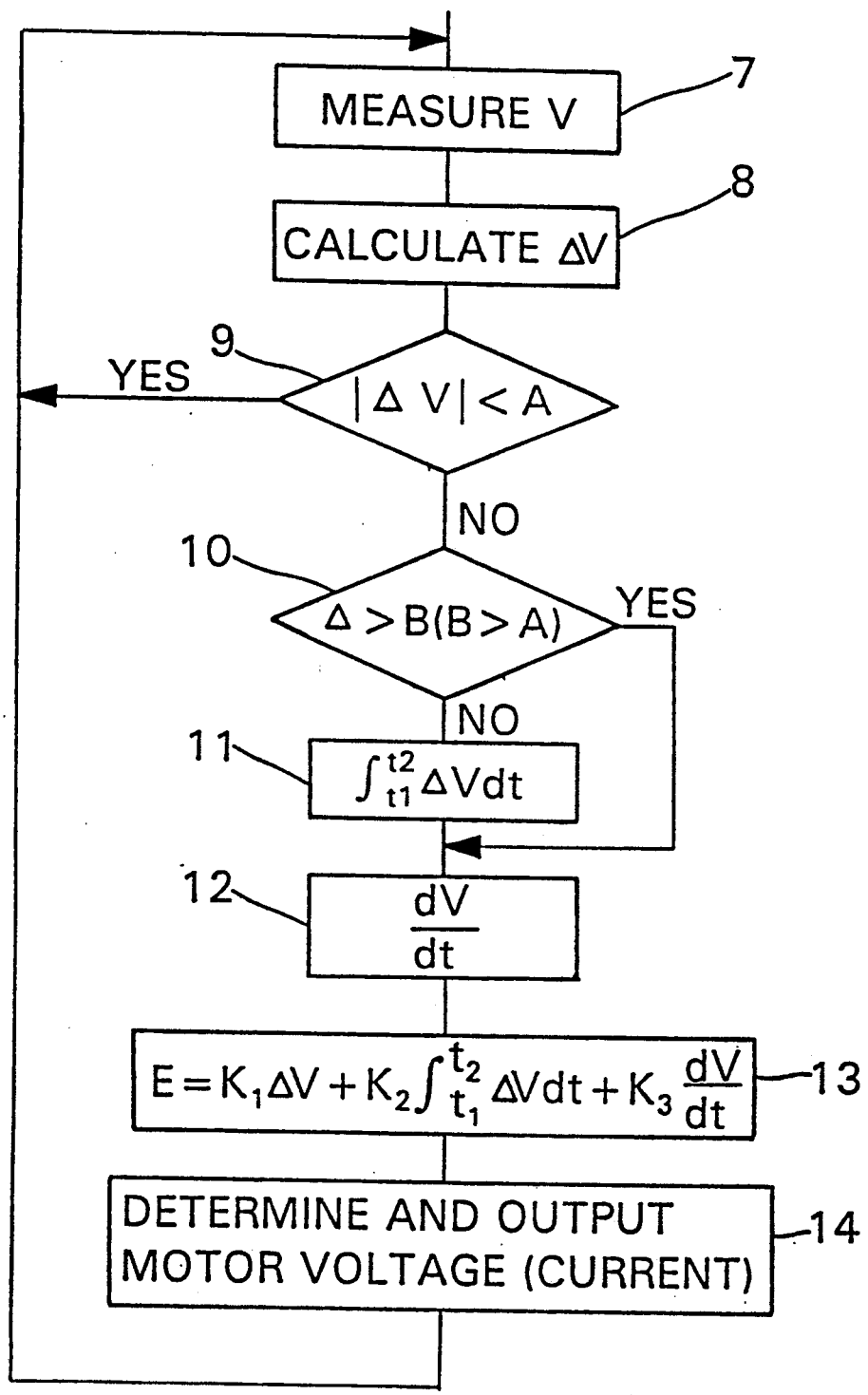
FIG. 5 is a flow chart of the device of FIG. 4.
Figure 6:
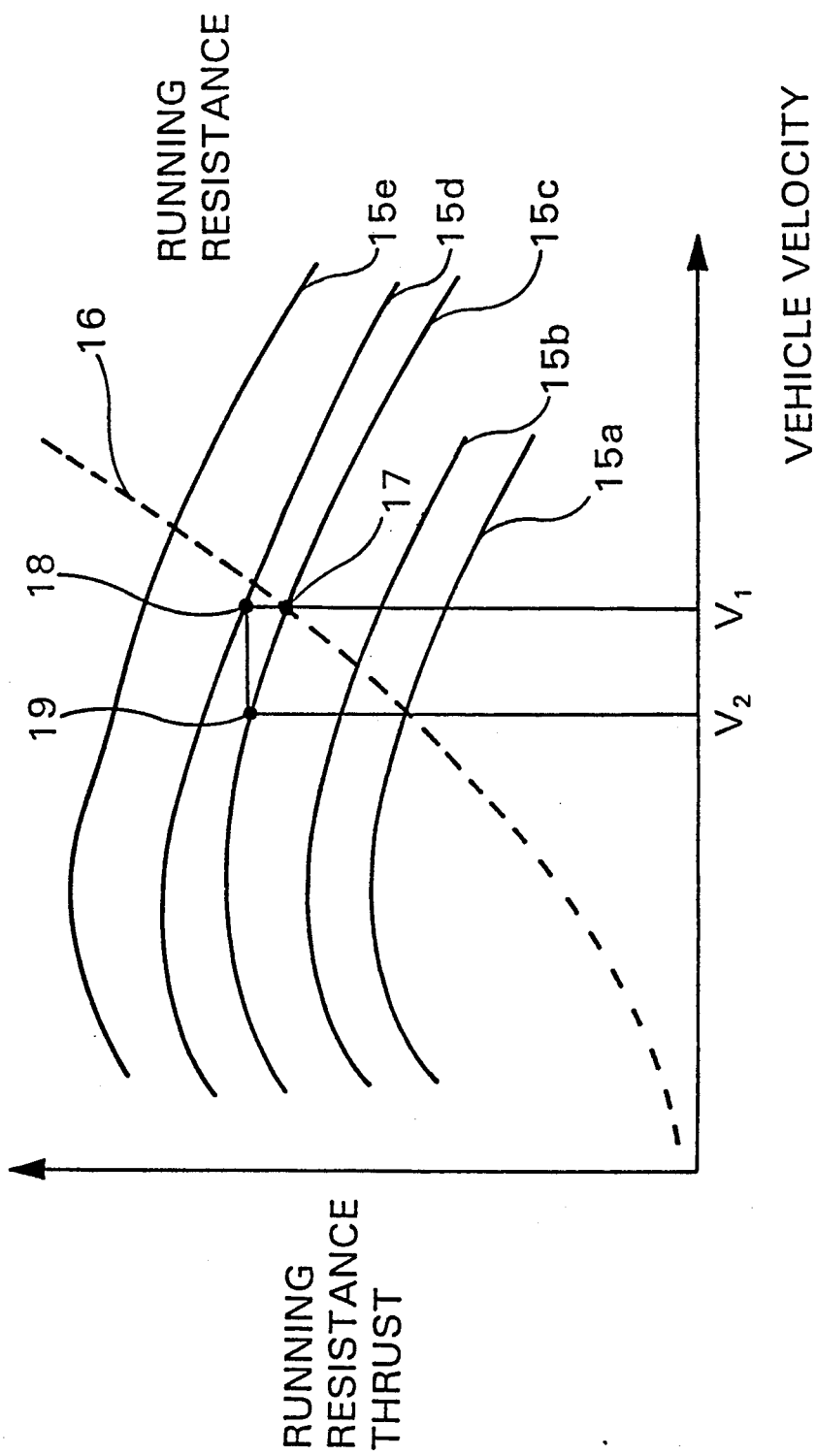
FIG. 6 is a graph showing vehicle engine characteristics.

FIG. 1 shows a schematic block diagram of a constant-speed regulating device according to the invention. The device of FIG. 1 comprises a control circuit 20, a drive circuit 2, an actuator 3, a cable 4, a throttle valve 5, and a throttle position sensor 6. The drive circuit 2, actuator 3, cable 4, throttle valve 5, and throttle position sensor 6 may be constructed in the same manner as those in the device of FIG. 4, and therefore their detailed description is omitted. The control circuit 20 comprises a nonvolatile memory 20a which retains its contents even when the main power is turned off.

Figure 2:
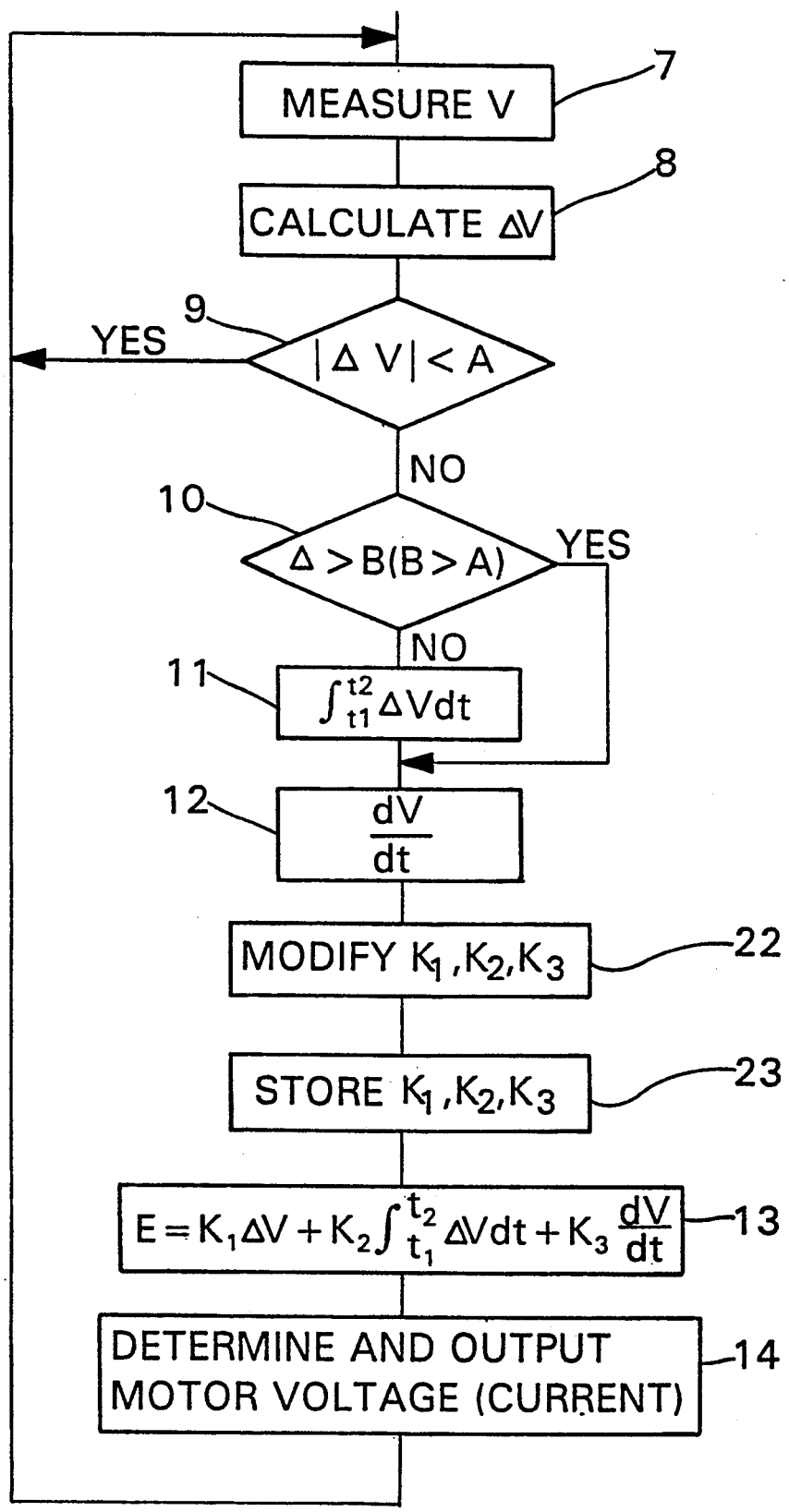
FIG. 2 is a flow chart of the device of FIG. 1.

The operation of the device of FIG. 1 will be described with reference to FIG. 2. In the same manner as the device of FIG. 4, the device of FIG. 1 performs the operations in blocks 7 to 12 to obtain the differential of the vehicle velocity V. Then, the process jumps to block 22 which judges whether the constants $K_1$, $K_2$ and $K_3$ are optimal or not. If they are not, the constants $K_1$, $K_2$ and $K_3$ are modified or rewritten, and in the next block 23, these new constants are stored in the nonvolatile memory 20a. Using these new constants $K_1$, $K_2$ and $K_3$ the output to the drive circuit 2 is determined in blocks 13 and 14. In the embodiment, changes in the constants $K_1$, $K_2$ and $K_3$ can be performed by judging former control results; for example, if the vehicle velocity is severely overshot and there is some vibration, the coefficient $K_3$ for differentiation is made larger. The control circuit 20 calculates the value E using the equation (1) (block 13), and outputs the value E (block 14).

As described above, this invention realizes a constant-speed regulating device for vehicles with wide applicability in which the control constants $K_1$, $K_2$ and $K_3$ are rewritten based on past control results and these results are stored in a nonvolatile memory, so that it will not lose controllability even if the main power is turned off. Hence, the present device can be applied to a vehicle irrespective of type.

Figure 3:
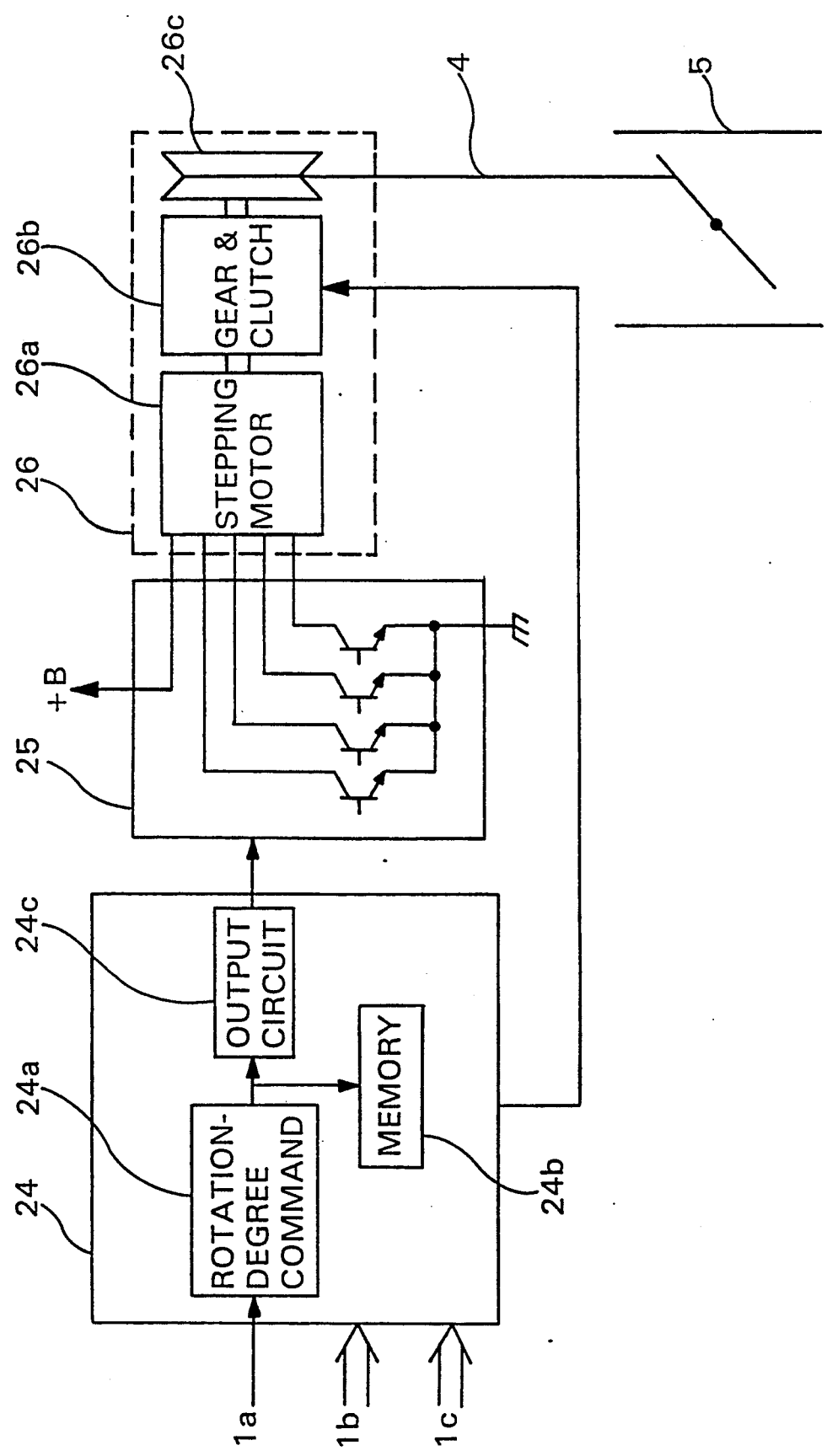
FIG. 3 is a block diagram illustrating another constant-speed regulating device according to the invention.

FIG. 3 shows another constant-speed regulating device for vehicles according to the invention. The device of FIG. 3 comprises a control circuit 24, a drive circuit 25, and an actuator 26. The control circuit 24 incorporates a rotation-degree command circuit 24a, a rotation-degree memory circuit 24b having a nonvolatile memory, and a phase excitation output circuit 24c. The actuator 26 comprises a stepping motor 26a, a gear and clutch assembly 26b, and a pulley 26c. In the same manner as the device of FIG. 1, the pulley 26c is connected to the throttle valve 5 through the throttle cable 4. In the embodiment, however, the throttle position sensor 6 used in the device of FIG. 1 is not necessary.

The operation of the device shown in FIG. 3 will be described. The rotation-degree command circuit 24a which receives the vehicle velocity V in the form of the input 1a calculates the vehicle velocity difference $\Delta V$, integral of $\Delta V$ and differential of V in the same manner as in the device of FIG. 1. Then, the rotation-degree command circuit 24a calculates the value E using the above-mentioned equation (1). Unlike in the device of FIG. 1 in which the value E designates the motor voltage (or current), in the embodiment, the rotation-degree command circuit 24a supplies the value E to the rotation-degree memory circuit 24b as the value designating the degree of rotation of the stepping motor 26a. The rotation-degree memory circuit 24b distinguishes the direction (clockwise or counter clockwise) indicated by the value E, and stores the value E as the rotation angle of the stepping motor 26a. The output circuit 24c which receives the value E from the command circuit 24a produces a concrete excitation pattern, and supplies it to the drive circuit 25. The output of the drive circuit 25 causes the stepping motor 26a to rotate and ultimately determines the degree to which the throttle valve 5 opens. In the embodiment, the contents of the memory circuit 24b correspond one to one to the degree to which the throttle valve 5 opens.

As described above, in the embodiment, the stepping motor 26a functions as the power source for the actuator 26, and the control circuit 24 is provided with the memory circuit 24b to store the turning angle over one rotation or more of the stepping motor 26a, so that a constant-speed regulating device for vehicles is realized which has an excellent controllability and is capable of accurately controlling the throttle position (throttling) without the use of a throttle position sensor.

In the device of FIG. 3, moreover, the information regarding the stepping motor position can be retained in the memory circuit 24b even when the main power is turned off, enabling that, even after a temporary loss of power, the present device can operate using previously stored information.

Each of the constants $K_1$, $K_2$ and $K_3$ may be a product of a previously determined constant and a coefficient. The previously determined constant and coefficient may be stored in a ROM provided in the control circuit 20. The coefficient may be suitably selected in accordance with a control result from a plurality of values which are previously stored in the ROM. Alternatively, initially values of the constants $K_1$, $K_2$ and $K_3$ is stored in the ROM, and then the value of each of the constants $K_1$, $K_2$ and $K_3$ is gradually changed in accordance with a control result, using a prefixed expression.

In the above, embodiments in which the PID control system is employed are described. However, the present invention is not restricted to devices using the PID control system, but is applicable to those using a control system of any other type such as a fuzzy control system.

Instead of the gear and clutch assembly 3b and 26b, any other means may be used. Examples of such a means include a reduction means of another type such as a pulley and belt system, and a mechanical means of ON-OFF switching (e.g., ON-OFF linkage using gears).

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a constant-speed regulating device for a vehicle comprising: a control circuit which receives information regarding the running velocity of the vehicle and produces an output signal as a result of calculations in which said information and initial control constants are used; a drive circuit which receives said output signal and produces a drive signal; and an actuator for opening and closing the throttle valve of the vehicle, said actuator being driven in accordance with said drive signal, said control circuit comprises: a means for modifying at least one of said initial control constants to provide optimal speed regulation; and a means for storing at least said modified control constants wherein said modified control constants are thereafter used by said control circuit in place of the corresponding initial control constants to produce said output signal even when the main power is turned off, and wherein said initial and modified control constants are those used in a PID control system.

2. A constant-speed regulating device according to claim 1 wherein said control circuit receives data regarding at least the type of vehicle, the state of the engine, and the gear position, and said modifying means modifies at least one of said initial control constants in accordance with one or more items of said data.

3. A constant-speed regulating device according to claim 1 wherein said initial control constants consist of one of previously determined constants and a coefficient portion which is to be multiplied thereto, the value of said coefficient portion being changeable, said coefficient portion being stored even when the main power is turned off.

4. In a constant-speed regulating device for a vehicle comprising: a control circuit which receives information regarding the running velocity of the vehicle and produces an output signal; a drive circuit which receives said output signal and produces a drive signal; and an actuator for opening and closing the throttle valve of the vehicle, said actuator being driven in accordance with said drive signal, said actuator comprises a stepping motor which functions as the driving power source, and said control circuit comprises a means for storing the rotation angle of said stepping motor, wherein said storing means stores the rotation angle of said stepping motor which is beyond one revolution.

5. A constant-speed regulating device according to claim 4 wherein said storing means stores the rotation angle of said stepping motor which is within one revolution.

6. A constant-speed regulating device according to claim 4 wherein said storing means is a nonvolatile memory which can retain its contents even when the main power is turned off.

7. In a constant-speed regulating device for a vehicle comprising: a control circuit which receives information regarding the running velocity of the vehicle and produces an output signal as a result of calculations in which said information and initial control constants are used; a drive circuit which receives said output signal and produces a drive signal; and an actuator for opening and closing the throttle valve of the vehicle, said actuator being driven in accordance with said drive signal, said actuator comprises a stepping motor which functions as the driving power source, said control circuit receives data regarding at least the type of vehicle, the state of the engine, and the gear position, and comprises: a first memory means for storing the rotation angle of said stepping motor which is within or beyond one revolution; a means for modifying at least one of said initial control constants to provide optimal speed regulation; said modifying means modifying at least one of said initial control constants in accordance with one or more items of said data; a second memory means for storing at least said modified control constants even when the main power is turned off, and wherein said modified control constants are thereafter used by said control circuit in place of the corresponding initial control constants to produce said output signal.

8. A constant-speed regulating device according to claim 7 wherein said first memory means retains its contents even when the power of said control circuit is turned off.

9. A constant-speed regulating device according to claim 7 wherein said initial and modified control constants are those used in a PID control system.

10. A constant-speed regulating device according to claim 7 wherein said initial control constants comprise one of previously modified constants and a coefficient portion which is to be multiplied thereto, the value of said coefficient portion being changeable, said coefficient portion being stored even when the main power is turned off.

* * * * *

UNITED STATES PATENT AND TRADEMARK OFFICE
CERTIFICATE OF CORRECTION

PATENT NO. : 5,162,998

DATED : November 10, 1992

INVENTOR(S) : Yasuhiro Kondo

It is certified that error appears in the above-identified patent and that said Letters Patent is hereby corrected as shown below:

Column 7

In Claim 3, line 2, delete "consist of" and insert therefore --comprised--.

In Claim 3, line 3, delete "determined" and insert therefore --modified--.

Signed and Sealed this

Twenty-sixth Day of October, 1993

Attest:

BRUCE LEHMAN

Attesting Officer

Commissioner of Patents and Trademarks